US006845086B1

United States Patent
Ayoub

(10) Patent No.: US 6,845,086 B1
(45) Date of Patent: Jan. 18, 2005

(54) CELLULAR CONGESTION REDUCTION VIA INTRACELL HANDOVER PROVIDING FIXED AND FLEXIBLE SERVICE

(75) Inventor: Souhad Ayoub, Huddinge (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/424,871

(22) PCT Filed: Jun. 8, 1998

(86) PCT No.: PCT/SE98/01084

§ 371 (c)(1),
(2), (4) Date: Feb. 16, 2000

(87) PCT Pub. No.: WO98/57517

PCT Pub. Date: Dec. 17, 1998

(30) Foreign Application Priority Data

Jun. 12, 1997 (SE) ............................................... 9702238

(51) Int. Cl.[7] ............................................. H04B 7/212
(52) U.S. Cl. ........................ 370/331; 370/337; 370/347
(58) Field of Search ................................. 370/331, 337, 370/347, 368, 329, 321, 322, 468

(56) References Cited

U.S. PATENT DOCUMENTS

| 5,504,939 A | | 4/1996 | Claes et al. | |
| 5,729,541 A | * | 3/1998 | Hamalainen et al. | ....... 370/337 |
| 5,940,763 A | * | 8/1999 | Alperovich et al. | ........ 455/450 |

FOREIGN PATENT DOCUMENTS

| WO | WO9502307 | 1/1995 |
| WO | WO9701254 | 1/1997 |

* cited by examiner

*Primary Examiner*—Chau Nguyen
*Assistant Examiner*—Soon Dong Hyun
(74) *Attorney, Agent, or Firm*—Oblon, Spivak, McClelland, Maier & Neustadt, P.C.

(57) ABSTRACT

The invention relates to a method at a cellular radio communications system which makes possible that the probability of congestion for multislot mobiles in said system is reduced. In the future, the GSM-system will offer high speed data services, at which one of these is HSCSD (High Speed Circuit Switched Data). The HSCSD-service includes two services called "fixed service" and "flexible service". At the first mentioned service, the mobile is allocated a fixed number of time slots which shall be allocated during the whole call, whereas at the last mentioned service the number of allocated time slots can vary during the course of the call. The mobile stations of today with their simplex filters can perform only one thing at a time, i.e. either transmit, measure or receive signals. It therefore is important to have possibility to allocate consecutive time slots for multislot mobiles. By that demands are made for that the algorithm of the channel allocation in an efficient way shall be able to allocate the free time slots in order to increase the channel utilization and data speed. The invention solves this problem by utilizing intracell handover to meet the demands for consecutive time slots. This results in that the probability of congestion for mobiles which have requested "fixed service" will be reduced and approach the probability of congestion for one-slot mobiles. Another advantage with intracell handover is that the data speed for mobiles which have requested "flexible service" will increase.

4 Claims, 1 Drawing Sheet f1 | C1 | C2 | C3 | C4 | C5 | C6 | C7 | C8 |
f2 | C1 | C2 | C3 | C4 | C5 | C6 | C7 | C8 |
f3 | C1 | C2 | C3 | C4 | C5 | C6 | C7 | C8 |

CELLULAR CONGESTION REDUCTION VIA INTRACELL HANDOVER PROVIDING FIXED AND FLEXIBLE SERVICE

FIELD OF THE INVENTION

The present invention relates to a method at a cellular radio communications system to reduce the probability of congestion of multislot mobiles in said systems.

Intracell handover means that a call going on is switched from a physical channel to another physical channel in the same cell, i.e. changes from one time slot to another time slot in the same cell. Intracell handover is a known technology to reduce the interference, i.e. if a physical channel gives rise to interference, there will be a change-to a channel with less interference.

In the future, the GSM-system will offer high speed data services. One of the data services is HSCSD (High Speed Circuit Switched Data). This service in its turn includes two services "fixed service" and "flexible service". At "fixed service" the mobile is allocated a fixed number of time slots which shall be allocated in a fixed way during the whole call, whereas at "flexible service" the number of allocated time slots can vary during the course of the call. The mobile stations of today with their simplex filters can perform only one thing at a time, i.e. either transmit or receive. Therefore it is of great importance to allocate consecutive time slots for multislot mobiles. This makes great demands upon the mobile system to make it possible to manage both data services and voice services at the same time. Not least there will be demands on the algorithm of the channel allocation to, in a more intelligent way, allocate the free time slots to increase the channel utilization and the data speed.

The intention is that in the future the mobile will, at its arrival, request a service and with this a number of time slots. If the service is "fixed service" and the free capacity is lower than the requested, the mobile will be blocked. If, on the other hand, the service is "flexible service"the free capacity is allocated. The demand for consecutive time slots for multislot mobiles an the use of many time slots for a mobile results in that:

the probability of congestion for multislot mobiles which request "fixed service" will be considerably higher than for mobiles which request other services (for instance voice services).

that the mean data rate for mobiles which have requested "flexible service" will be low.

From the operator's point of view it is desirable to have the same probability of congestion for all mobile users, irrespective of service. This will, among other things, facilitate the network planning and restrict the use of the priority concept. Another object desired is to get such a high data rate as possible.

SUMMARY OF THE INVENTION

The aim of the present invention consequently is to reduce the probability of congestion of multislot mobiles and reduce this probability of congestion to a level which corresponds to the level for one-slot mobiles.

The above mentioned aim is achieved by a method at a cellular radio communications system to reduce the probability of congestion for multislot mobiles in said system, at which intracell handover is utilized in order to reduce said probability of congestion.

The probability of congestion for multislot mobiles which request the data service "fixed service" will be reduced and will be equal to the probability of congestion for one-slot mobiles, which results in an increased channel utilization in the cell. Since the probability of congestion is the same for different services, the planning of the network will, in addition, be simplified for an operator.

Another advantage is that the mean data rate for mobiles which have requested the service "flexible service" will increase.

Further characteristics of the present invention are given in the subclaims.

BRIEF DESCRIPTION OF THE DRAWINGS

A more complete appreciation of the present invention and many of the attendant advantages thereof will be readily obtained as the same becomes better understood by reference to the following detailed descriptions and accompanying drawings:

FIG. 1 is a depiction of multiple channels with slots available for assignment by a base station;

FIG. 2 is a depiction of random slot assignment according to the conventional art;

FIG. 3 is a depiction of a rearranged slot assignment according to one embodiment of the present invention; and FIG. 4 is a depiction of blocking a fixed length request according to another embodiment of the present invention.

DETAILED DESCRIPTION OF AN EMBODIMENT OF THE INVENTION

As noted in the Background Art section, intracell handover means that a call going on is switched from a physical channel to another physical channel in the same cell, i.e. changes from one time slot to another time slot in the same cell.

A cell is a coverage area for a base station. This base station can have one or more TRXes. A TRX consists of one frequency in uplink and one frequency in downlink. Each frequency in GSM is divided into 8 time slots. Consecutive time slots means that time slots are following each other in time. Intracell handover involves moving an existing call from one time slot to another time slot which is in the same cell. Multislot mobiles are mobiles without duplex filters that therefore require consecutive time slots because these mobiles only can do one thing at a time (i.e. either transmit, measure or receive information). Consecutive time slots make it possible to increase the function time for transmitting and receiving data information without these functions interfering with each other in time. A non-multislot mobile uses duplex filters so the mobile can receive and transmit data information at the same time and consecutive time slots are not required.

To organize multislot mobiles into consecutive time slots, one or more other mobiles have to change channel (i.e., time slot) in order to allow the multislot mobiles to have access to consecutive time slots. When intracell handover in the present invention creates consecutive time slots, extra consecutive time slots are made accessible to mobiles which request "flexible service", which means that these mobiles can utilize said time slots to transfer data. Consequently the data speed will increase for mobiles which have requested "flexible service" since more time slots can be utilized.

In this embodiment, accordingly, intracell handover is used to satisfy the demands for the multislot mobiles for consecutive time slots.

This will result in that the probability of congestion for mobiles which request "fixed service" will be considerably reduced and will approach the probability of congestion for one-slot mobiles. Another advantage of intracell handover is that the mean data rate for mobiles which have requested "flexible service" will increase. Intracell handover, however, will not be enough to achieve an optimal system. The present invention supplements the use of intracell handover in order to optimize the system. The present invention consequently includes two completing steps in order to further reduce the probability of congestion and increase the data speed.

1) At "fixed service" it is not sufficient with intracell handover to eliminate the difference between probability of congestion for multislot- and one-slot mobiles. I multislot mobiles request "fixed service" for x number of requested time slots but find that there are at the most x−1 time slots free, these multislot mobiles will be blocked. This procedure can be made on cell basis, which results in that the problem of truncating is abolished.

2) At "flexible service" a mobile requiring a predetermined number of time slots is required to always request a maximum number of allowed time slots.

The invention is primarily intended to be utilized in connection with the use of future data services in GSM, namely HSCSD (High Speed Circuit Switched Data) in the GSM system, or similar systems where multichannels are used by a user.

The above mentioned is only to be regarded as a preferred embodiment of the invention, and the extent of protection of the invention is only defined by what is indicated in the enclosed patent claims.

What is claimed is:

1. A method for reducing the probability of congestion for a multislot mobile in a cellular radio communications system, comprising:

assigning a first plurality of slots to a first multislot mobile;

receiving a request for a second plurality of slots from a second multislot mobile;

rearranging the first plurality of slots by performing intracell handover to create a plurality of consecutive unassigned slots; and assigning the plurality of consecutive unassigned slots to the second multislot mobile.

2. The method according to claim 1, further comprising at least one of:

blocking a connection of a calling fixed service multislot mobile requesting fixed service for a predetermined number of x consecutive time slots when, at most, there are x−1 consecutive free time slots available; and requiring a calling flexible service mobile requiring a predetermined number of consecutive time slots to request a preset maximal number of consecutive time slots, said preset maximal number being equal to or larger than the predetermined number.

3. The method according to claim 2, wherein said radio communications system consists of HSCSD.

4. The method according to claim 3, wherein said radio communications system consists of GSM.

* * * * *